Patented Nov. 28, 1933

1,936,836

UNITED STATES PATENT OFFICE 1,936,836

MANUFACTURE OF WATER-FREE ETHYL ALCOHOL

Adolf Gorhan, Liesing, near Vienna, Austria, assignor to Deutsche Gold- und Silber-Scheideanstalt vormals Roessler, Frankfort - on - the - Main, Germany, a company of Germany No Drawing. Application November 3, 1931, Serial No. 572,838, and in Germany February 4, 1931

18 Claims. (Cl. 202—68)

This invention relates to the production of water-free alcohol, and is particularly concerned with the treatment of alcohol according to the process set forth in my Patent No. 1,879,847 granted September 27, 1932.

In the specification of the application above referred to there has been described a process for the production of water-free ethyl alcohol by means of dehydrating salts, characterized by the fact that a solution of such salts in absolute alcohol is passed on the counter-current principle through the vapour of the aqueous alcohol, the salts, which have been dehydrated by heat, having been dissolved, in the hot molten condition, by stirring in the absolute alcohol. The regeneration and re-use of the dehydrated salt are important for this process. The regeneration of the salt may be effected by dehydration by steam-heating in steam pans.

It has been found that for such a method of working it is desirable that the salt should remain liquid in all the stages of dehydration up to its melting stage. The salt that is the most suitable for this process is potassium acetate. This salt, however, does not fulfill the above stated condition in an ideal manner; less satisfactory in this respect are other salts, such as calcium chloride, magnesium chloride, magnesium nitrate, calcium nitrate, etc., which come into consideration by reason of their solubility in alcohol.

It is known to lower the melting point of a salt by the addition of another salt. Now, on investigating the most favorable working conditions with mixtures of salts, it has been found that a mixture of potassium acetate and sodium acetate within fairly wide limits of mixing proportions is particularly suitable for carrying out the process. The most favorable mixture has proved to be one having 70% of potassium acetate and 30% of sodium acetate, because, in addition, the difference between the raised boiling point of the water and the solidifying point of this aqueous salt mixture is the greatest of all concentrations. It could not be assumed at the outset that just this mixture would show particularly good properties for the practical carrying out of the process, especially as the dehydrating action of sodium acetate is far less powerful than that of potassium acetate and moreover, sodium acetate does not dissolve in alcohol. However, contrary to expectation, a mixture of the aforesaid composition dehydrates alcohol quite as well as potassium acetate by itself, and, on running the molten mass into absolute alcohol, the sodium acetate separates in very fine flakes, so that the essential condition of the fluidity of the salt that is being dehydrated, in all the stages of the process, is fulfilled.

It has also been found that in such a mixture of salts as above described, the potassium acetate or the sodium acetate can be wholly or in part replaced by the acetates of other alkali metals or of earth alkali metals. Also, instead of the acetates, salts of other fatty acids—e. g. formates, propionates and the like—can be used in certain circumstances. At least one salt that is soluble in absolute alcohol must always be present in these mixtures of salts and at least one of the salts must exert a dehydrating action. It is advantageous to employ the alcohol-soluble salt in excess. Especially lithium-containing mixtures of salts are of great value. A mixture of lithium acetate and potassium acetate has, as compared with a mixture of sodium acetate and potassium acetate, the advantage that, as both salts are soluble in absolute alcohol, an absolutely clear solution enters the column, whereas hitherto it was only possible to use a potassium acetate solution with a suspension of sodium acetate. It is possible with mixtures of lithium acetate and potassium acetate to avoid any soiling of the supply members. As compared with pure potassium acetate, it is possible, on using binary mixtures of salts, to lower the dehydrating temperature by 60–80° C. so that the dehydration of the mixture of salts can be carried out far below the decomposition point of potassium acetate.

This melting point of the mixture of salts can be further lowered by 30–40° C. by a third component and in this way a fresh saving in regeneration costs can be obtained. If a mixture of lithium acetate and potassium acetate is employed, then sodium acetate, for example, can be added as the third salt. However, additions of earth alkali salts—e. g. calcium acetate—have proved to be useful.

It is to be understood that various modifications in the above-mentioned examples may be made within the scope of the appended claims.

What I claim is:—

1. A process for dehydrating aqueous alcohol comprising contacting aqueous alcohol in vapor condition with a dehydrating liquid in such amount as to render the alcohol water-free, said dehydrating liquid comprising potassium acetate and sodium acetate rendered anhydrous by heat and being dissolved in absolute alcohol without passing through the solid state.

2. A process for dehydrating aqueous alcohol comprising contacting aqueous alcohol in vapor condition with a dehydrating liquid in such amount as to render the alcohol water-free, said dehydrating liquid comprising about 70 parts potassium acetate and about 30 parts sodium acetate rendered anhydrous by heat and being dissolved in absolute alcohol without passing through the solid state.

3. A process for dehydrating aqueous alcohol comprising contacting aqueous alcohol in vapor condition with a dehydrating liquid in such amount as to render the alcohol water-free, said dehydrating liquid comprising the mixture of potassium acetate and the acetate of another alkali metal rendered anhydrous by heat and being dissolved in absolute alcohol without passing through the solid state.

4. A process for dehydrating aqueous alcohol comprising contacting aqueous alcohol in vapor condition with a dehydrating liquid in such amount as to render the alcohol water-free, said dehydrating liquid comprising a mixture of sodium acetate and the acetate of another alkali metal rendered anhydrous by heat and being dissolved in absolute alcohol without passing through the solid state.

5. A process for dehydrating aqueous alcohol comprising contacting aqueous alcohol in vapor condition with a dehydrating liquid in such amount as to render the alcohol water-free, said dehydrating liquid comprising a mixture of sodium acetate, potassium acetate and the acetate of another alkali metal rendered anhydrous by heat and being dissolved in absolute alcohol without passing through the solid state.

6. A process for dehydrating aqueous alcohol comprising contacting aqueous alcohol in vapor condition with a dehydrating liquid in such amount as to render the alcohol water-free, said dehydrating liquid comprising a mixture of alkali salts of the lower fatty acids rendered anhydrous by heat and being dissolved in absolute alcohol without passing through the solid state.

7. A process for dehydrating aqueous alcohol comprising contacting aqueous alcohol in vapor condition with a dehydrating liquid in such amount as to render the alcohol water-free, said dehydrating liquid comprising an alkali metal salt of the lower fatty acids rendered anhydrous by heat and being dissolved in absolute alcohol without passing through the solid state.

8. A process for dehydrating aqueous alcohol comprising contacting aqueous alcohol in vapor condition with a dehydrating liquid in such amount as to render the alcohol water-free, said dehydrating liquid comprising a mixture of potassium acetate and the acetate of an earth alkali rendered anhydrous by heat and being dissolved in absolute alcohol without passing through the solid state.

9. A process for dehydrating aqueous alcohol comprising contacting aqueous alcohol in vapor condition with a dehydrating liquid in such amount as to render the alcohol water-free, said dehydrating liquid comprising a mixture of sodium acetate and the acetate of an earth alkali rendered anhydrous by heat and being dissolved in absolute alcohol without passing through the solid state.

10. A process for dehydrating aqueous alcohol comprising contacting aqueous alcohol in vapor condition with a dehydrating liquid in such amount as to render the alcohol water-free, said dehydrating liquid comprising a mixture of sodium acetate, potassium acetate, and the acetate of an earth alkali rendered anhydrous by heat and being dissolved in absolute alcohol without passing through the solid state.

11. A process for dehydrating aqueous alcohol comprising contacting aqueous alcohol in vapor condition with a dehydrating liquid in such amount as to render the alcohol water-free, said dehydrating liquid comprising an earth alkali salt of the lower fatty acids rendered anhydrous by heat and being dissolved in absolute alcohol without passing through the solid state.

12. A process for dehydrating aqueous alcohol comprising contacting aqueous alcohol in vapor condition with a dehydrating liquid in such amount as to render the alcohol water-free, said dehydrating liquid comprising potassium acetate and lithium acetate rendered anhydrous by heat and being dissolved in absolute alcohol without passing through the solid state.

13. A process for dehydrating aqueous alcohol comprising contacting aqueous alcohol in vapor condition with a dehydrating liquid in such amount as to render the alcohol water-free, said dehydrating liquid comprising a mixture of calcium acetate and potassium acetate rendered anhydrous by heat and being dissolved in absolute alcohol without passing through the solid state.

14. A process for dehydrating aqueous alcohol comprising contacting aqueous alcohol in vapor condition with a dehydrating liquid in such amount as to render the alcohol water-free, said dehydrating liquid comprising a mixture of lithium acetate and sodium acetate rendered anhydrous by heat and being dissolved in absolute alcohol without passing through the solid state.

15. A process for dehydrating aqueous alcohol comprising contacting aqueous alcohol in vapor condition with a dehydrating liquid in such amount as to render the alcohol water-free, said dehydrating liquid comprising a mixture of sodium acetate and calcium acetate rendered anhydrous by heat and being dissolved in absolute alcohol without passing through the solid state.

16. A process for dehydrating aqueous alcohol comprising contacting aqueous alcohol in vapor condition with a dehydrating liquid in such amount as to render the alcohol water-free, said dehydrating liquid comprising a mixture of about 70 parts potassium acetate, about 20 parts sodium acetate and about 10 parts calcium acetate rendered anhydrous by heat and being dissolved in absolute alcohol without passing through the solid state.

17. A process for dehydrating aqueous alcohol comprising contacting aqueous alcohol in vapor condition with a dehydrating liquid in such amount as to render the alcohol water-free, said dehydrating liquid comprising an alcohol-soluble alkali metal salt of the lower fatty acids rendered anhydrous by heat and being dissolved in absolute alcohol without passing through the solid state.

18. A process for dehydrating aqueous alcohol comprising contacting aqueous alcohol in vapor condition with a dehydrating liquid in such amount as to render the alcohol water-free, said dehydrating liquid comprising an alcohol-soluble earth alkali salt of the lower fatty acids rendered anhydrous by heat and being dissolved in absolute alcohol without passing through the solid state.

ADOLF GORHAN.